June 23, 1936.  J. KEARNEY ET AL  2,045,472
BIRD CAGE PROTECTOR
Filed Oct. 30, 1933
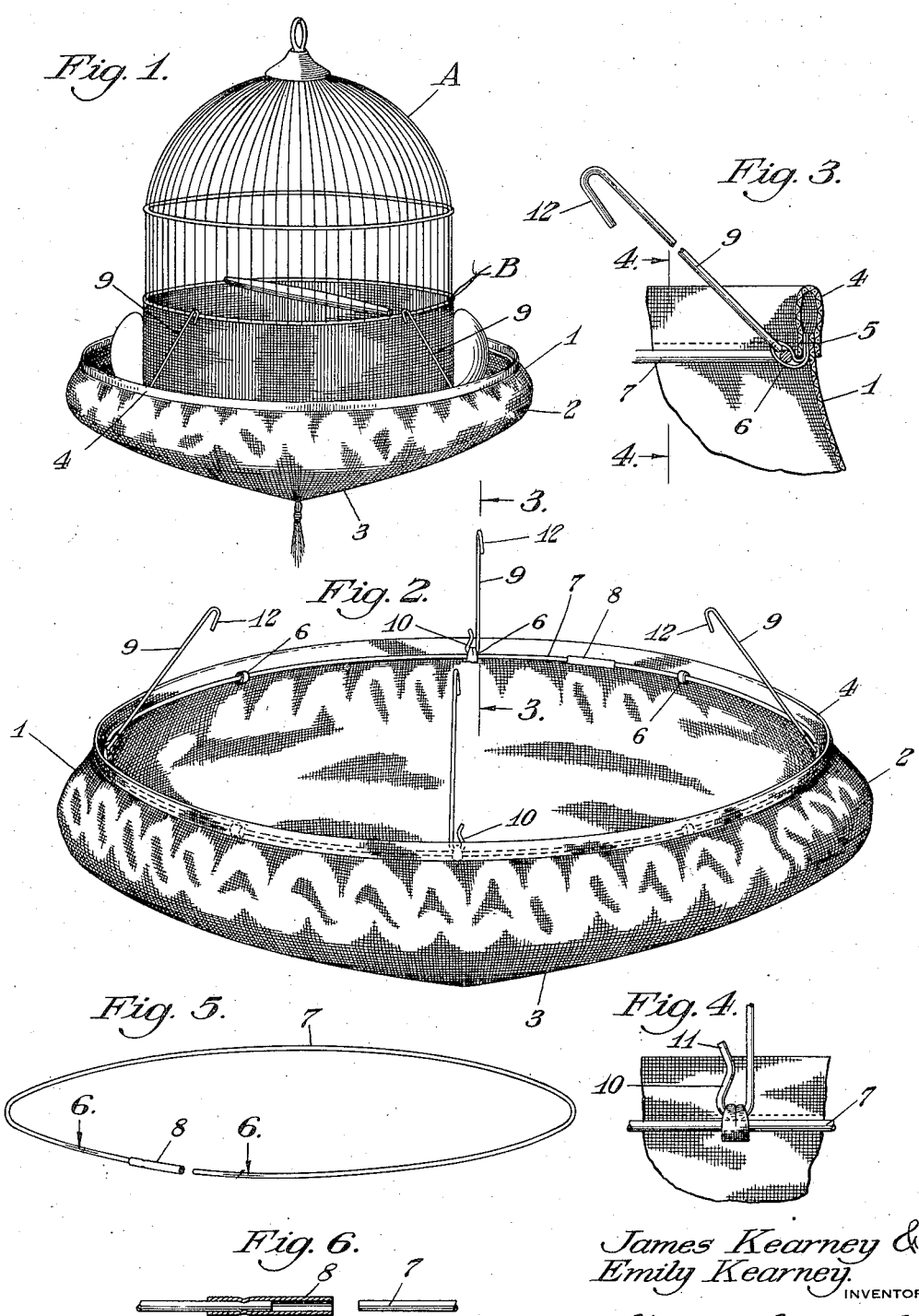
James Kearney &
Emily Kearney,
INVENTORS
BY Victor J. Evans & Co.
THEIR ATTORNEYS Patented June 23, 1936

2,045,472

UNITED STATES PATENT OFFICE 2,045,472

BIRD CAGE PROTECTOR

James Kearney and Emily Kearney, Chicago, Ill.

Application October 30, 1933, Serial No. 695,919

2 Claims. (Cl. 119—17)

This invention relates to bird cage protectors, and its general object is to provide a protector that not only catches seed, dirt and foreign matter that is thrown or falls from the cage to prevent the matter from accumulating on the floor or other surface below the cage, but can be kept in a clean and sanitary condition in that it includes a fabric body, and the cage attaching means for the fabric body is detachably associated therewith and is readily removed therefrom, so that the body can be laundered when necessary or desired.

Another object of the invention is to provide a bird cage protector that is ornamental, simple in construction, inexpensive to manufacture, and extremely efficient in use and service.

This invention also consists in certain other features of construction and in the combination and arrangement of the several parts, to be hereinafter fully described, illustrated in the accompanying drawing and specifically pointed out in the appended claims.

In describing our invention in detail, reference will be had to the accompanying drawing wherein like characters denote like or corresponding parts throughout the several views, and in which:

Fig. 1 is a perspective view showing the application of our protector to a bird cage;

Fig. 2 is an enlarged perspective view of the protector per se;

Fig. 3 is a sectional view taken approximately on line 3—3 of Fig. 2, looking in the direction of the arrows;

Fig. 4 is a sectional view taken approximately on line 4—4 of Fig. 3, looking in the direction of the arrows;

Fig. 5 is a perspective view of the split ring of our device; and

Fig. 6 is a sectional view taken approximately on line 6—6 of Fig. 5, looking in the direction of the arrows.

Referring to the drawing in detail, it will be noted that we have illustrated a form of our protector applied to what is termed a circular bird cage, but we want it understood that our device can be made in various forms to fit various shapes of cages.

The bird cage as shown is indicated by the letter A, and includes the usual reenforcing ring members, the lower one being indicated by the letter B, and which for the purpose of illustration acts as the supporting means for our device.

Our protector includes as an essential feature thereof a semi-stiff fabric body 1 which is of a size to completely surround the lower portion of the cage, and is shaped to provide an annular outwardly bulged portion 2 that merges into a substantially conical bottom portion 3, the latter underlying the bottom of the cage, as shown in Fig. 1. The peak of the bottom portion 3 may have secured thereto an ornamental device, such as a tassel or the like, to add to the attractiveness of the device.

It will be noted that the general shape of the body is of substantial oval formation, and the upper portion thereof is open to receive the cage. The upper edge of the open portion is reenforced by a hem 4 that is secured to the upper edge by suitable stitching 5. An important feature in securing the hem to the upper edge of the body is the fact that the body is gathered while the hem is not. That feature not only shapes the body so that it is permanently held accordingly, but the gathered portion of the body is retained in a symmetrical manner so that no adjustment of the gathered portion is required at any time.

Extending inwardly from the body at its juncture with the hem 4 are loops 6 which are arranged at regular intervals and are fixed with respect to the hem and body through the medium of the stitching 5, as clearly shown in Fig. 3. These loops perform a dual function, which will be presently apparent.

Threaded into all the loops is a split ring 7 which has its ends detachably associated with respect to each other through the instrumentality of a sleeve 8, the latter being secured to one end of the ring and frictionally receiving the opposite end, as best shown in Fig. 6. By this construction it will be apparent that the ring 7 is detachably associated with the body, and therefore can be readily removed and replaced with respect thereto.

Hook links 9 are employed for attaching the body with respect to the cage, and one end of each of these links has formed therewith a hook 10 that terminates in an outwardly flared portion 11, while the opposite ends may have like hooks, but as shown the last mentioned end is merely bent upon itself to provide a hook 12.

The hooks 10 are received by the loops, and while a link may be provided for each loop, we have shown four links arranged in pairs, with the link of one pair disposed directly opposite its companion link, so that when the hooks 12 are received by the reenforcing ring member B, the device will be conveniently supported about and below the cage, with the upper edge of the body, as well as the bulged portion 2, spaced a considerable distance laterally of the cage, as clearly shown in Fig. 1.

From the above description and disclosure of the drawing, it will be obvious that we have provided a bird cage protector that includes a fabric body that may be made from any well known material, and is provided with means for attaching it to the cage that can be easily and expeditiously removed from the body so that the latter can be laundered when desired.

The arrangement of the attaching means with respect to the body and the cage, together with the shape of the body, allows the latter to catch seed, dirt and foreign matter that may be thrown or falls from the cage.

It is thought from the foregoing description that the advantages and novel features of our invention will be readily apparent.

We desire it to be understood that we may make changes in the construction and in the combination and arrangement of the several parts, provided that such changes fall within the scope of the appended claims.

What we claim is:

1. A bird cage protector comprising a fabric body having an outwardly bulged side portion extending into a substantially conical bottom portion, said body having an open upper portion, a hem secured to the upper edge of the upper open portion in a manner whereby the body is gathered, loops extending inwardly from the juncture of the hem with the body, means received in said loops for holding the upper portion in open position, and hook members received by some of said loops and being adapted for detachably securing the protector to a cage.

2. A bird cage protector comprising a fabric body having an open upper portion to receive a cage, a hem, secured to the upper edge of the upper portion, loops extending inwardly from the body at the juncture of the hem therewith, a split ring threaded through the loops to hold the upper portion in open position, means for detachably securing the ends of the split ring together, and links having hooked ends received by some of said loops and for detachably securing the protector to the cage.

JAMES KEARNEY.
EMILY KEARNEY.